(12) United States Patent
Ringgenberg et al.

(10) Patent No.: US 12,229,978 B2
(45) Date of Patent: Feb. 18, 2025

(54) SYSTEMS AND METHODS FOR PRODUCING A LIGHT FIELD FROM A DEPTH MAP

(71) Applicant: FYR, Inc., Fort Worth, TX (US)

(72) Inventors: Kyle Martin Ringgenberg, Fort Worth, TX (US); Mark Andrew Lamkin, Fort Worth, TX (US); Jordan David Lamkin, Fort Worth, TX (US); Bryan Eugene Walter, Roanoke, TX (US); Jared Scott Knutzon, Roanoke, TX (US)

(73) Assignee: FYR, Inc., Fort Worth, TX (US)

( * ) Notice: Subject to any disclaimer, the term of this patent is extended or adjusted under 35 U.S.C. 154(b) by 902 days.

(21) Appl. No.: 17/345,436

(22) Filed: Jun. 11, 2021

(65) Prior Publication Data

US 2021/0390722 A1   Dec. 16, 2021

Related U.S. Application Data

(60) Provisional application No. 63/038,639, filed on Jun. 12, 2020.

(51) Int. Cl.
*G06T 7/557* (2017.01)
*H04N 13/271* (2018.01)

(52) U.S. Cl.
CPC .......... *G06T 7/557* (2017.01); *H04N 13/271* (2018.05); *G06T 2207/10028* (2013.01)

(58) Field of Classification Search
CPC .......... G06T 7/557; G06T 2207/10028; G06T 2200/08; G06T 2207/10024; G06T 2207/10052; G06T 7/593; H04N 13/271; H04N 13/232; H04N 13/111; H04N 2013/0081
See application file for complete search history.

(56) References Cited

U.S. PATENT DOCUMENTS

2004/0189796 A1*   9/2004   Ho ................. H04N 13/261
                                                348/42
2012/0162200 A1*   6/2012   Mishima ........... H04N 13/128
                                                345/419

(Continued)

OTHER PUBLICATIONS

PCT Notification of Transmittal of the Intl. Search Report and the Written Opinion of the Intl. Searching Authority, or the Declaration, Intl. Application No. PCT/US2021/037005, Sep. 2, 2021.

(Continued)

*Primary Examiner* — Solomon G Bezuayehu
(74) *Attorney, Agent, or Firm* — Baker Botts L.L.P.

(57) ABSTRACT

A system includes an electronic display, a computer processor, one or more memory units, and a module stored in the one or more memory units. The module is configured to access a source image stored in the one or more memory units and determine depth data for each pixel of a plurality of pixels of the source image. The module is further configured to map, using the plurality of pixels and the determined depth data for each of the plurality of pixels, the source image to a four-dimensional light field. The module is further configured to send instructions to the electronic display to display the mapped four-dimensional light field.

17 Claims, 9 Drawing Sheets

(56) References Cited

U.S. PATENT DOCUMENTS

| | | | | |
|---|---|---|---|---|
| 2013/0242086 A1* | 9/2013 | Brueckner | ............... | G06T 7/571 |
| | | | | 348/135 |
| 2014/0013273 A1* | 1/2014 | Ng | ............... | G06T 5/73 |
| | | | | 715/802 |
| 2015/0193937 A1* | 7/2015 | Georgiev | ............... | G06T 7/557 |
| | | | | 382/168 |
| 2015/0279056 A1* | 10/2015 | Akeley | ............... | G06T 5/00 |
| | | | | 345/589 |
| 2017/0201674 A1* | 7/2017 | Yamamoto | ............... | H04N 5/272 |
| 2017/0223339 A1* | 8/2017 | Kondo | ............... | G06T 7/55 |
| 2018/0324399 A1* | 11/2018 | Spears | ............... | H04N 23/698 |
| 2018/0342075 A1* | 11/2018 | Wang | ............... | H04N 13/139 |
| 2020/0137376 A1 | 4/2020 | Deng | | |

OTHER PUBLICATIONS

Qiaosong Wang et al., "Stereo vision-based depth of field rendering on a mobile device" *Journal of Electronic Imaging*, SPIE, vol. 23, No. 2, Mar. 1, 2014.

\* cited by examiner

SYSTEMS AND METHODS FOR PRODUCING A LIGHT FIELD FROM A DEPTH MAP

PRIORITY

This application claims the benefit under 35 U.S.C. § 119(e) of U.S. Provisional Patent Application No. 63/038,639, filed 12 Jun. 2020, which is incorporated herein by reference in its entirety.

TECHNICAL FIELD

The present disclosure relates generally to imaging systems, and more specifically to systems and methods for producing a light field from a depth map.

BACKGROUND

Traditional electronic displays encode data as a two-dimensional (2D) matrix of pixels (x, y). This pixel data can be stored in various formats such as RGB, RGBA, BGR, and HSV. In contrast to the flat, 2D data representation of traditional electronic displays, light field displays provide a four-dimensional (4D) display of data. 4D light fields are generated using 4D plenoptic vectors that are composed of position (x, y) and angle (theta, phi), with a color value (e.g., RGB) for each permutation.

SUMMARY

Traditional electronic displays encode data as a two-dimensional (2D) matrix of pixels (x, y). This pixel data can be stored in various formats such as RGB, RGBA, BGR, and HSV. In contrast to the flat, 2D data representation of traditional electronic displays, light field displays provide a four-dimensional (4D) display of data. 4D light fields are generated using 4D plenoptic vectors that are composed of position (x, y) and angle (theta, phi), with a color value (e.g., RGB) for each permutation.

Traditional media content (e.g. images and video) typically does not contain the necessary angular information (theta, phi) for 4D light field displays. Computing the missing angular information is complex and computationally intensive. In practice, this means that 4D light field data must either be pre-rendered explicitly as 4D light field data (in a non-real-time fashion), or considerable GPU horsepower (e.g. arrays of high-end graphics cards) must be committed to calculate the four-dimensional data. 4D light field generation is so computationally expensive that it generally cannot be done in real-time without extremely powerful hardware (e.g., numerous GPUs running in parallel).

To address these and other problems with providing 4D light fields, embodiment of the disclosure provide novel systems and methods for producing a light field from a depth map. In some embodiments, a system includes an electronic display, a computer processor, one or more memory units, and a module stored in the one or more memory units. The module is configured to access a source image stored in the one or more memory units and determine depth data for each pixel of a plurality of pixels of the source image. The module is further configured to map, using the plurality of pixels and the determined depth data for each of the plurality of pixels, the source image to a four-dimensional light field. The module is further configured to send instructions to the electronic display to display the mapped four-dimensional light field.

The disclosed embodiments provide several practical applications and technical advantages, which include at least: 1) circumventing the need for multiple render passes to produce a 4D light field by instead programmatically computing the necessary data for the 4D light field from a single two-dimensional (2D) or two-and-a-half-dimensional (2.5D) source image; and 2) the real-time generation of a 4D light field from a 2D or 2.5D source, even on low-end computing hardware (e.g., a smartphone CPU/GPU).

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
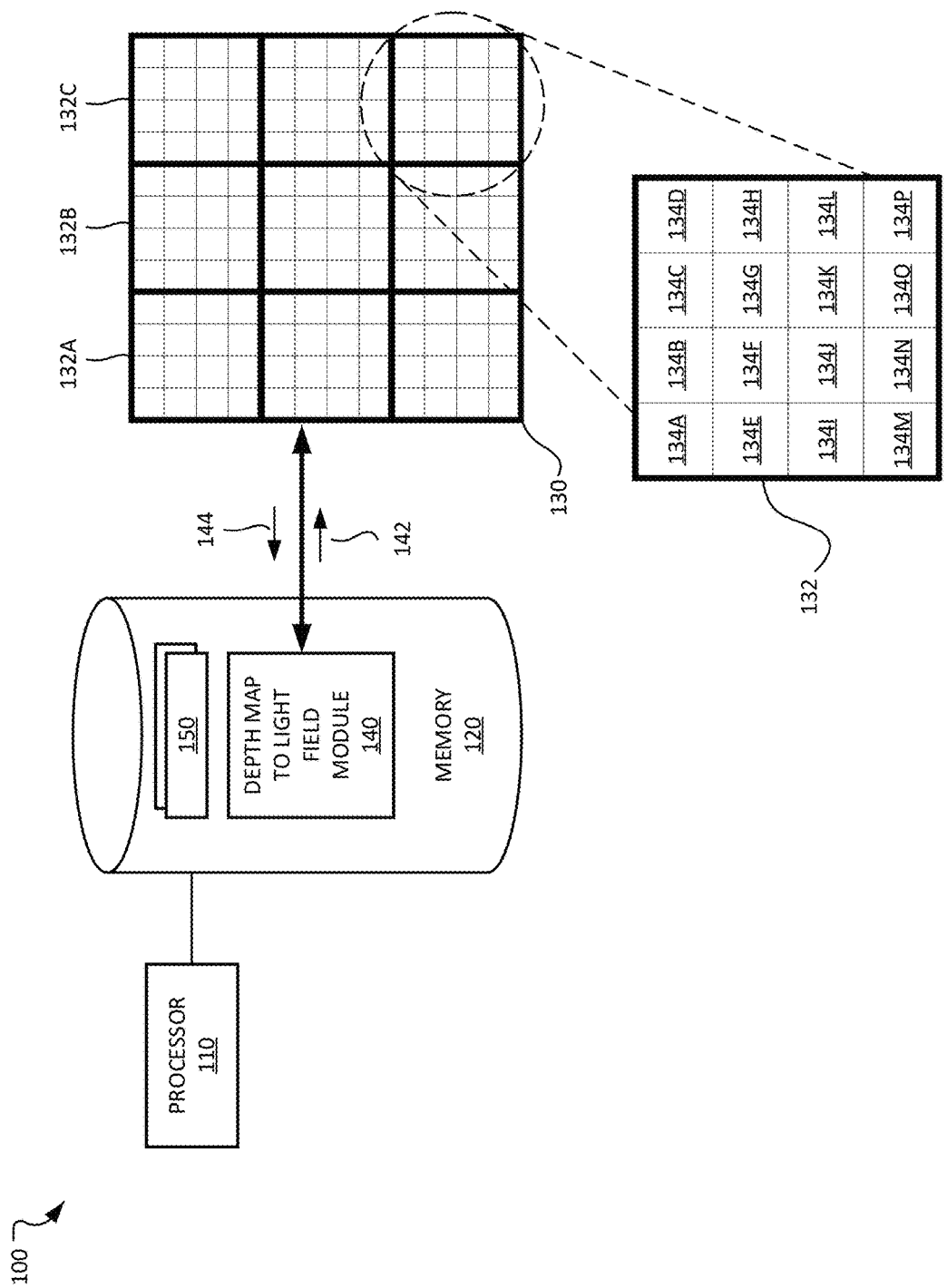
FIG. 1 is a schematic diagram of an example system for producing a light field from a depth map, according to certain embodiments.

Embodiments of the present disclosure and its advantages are best understood by referring to FIGS. 1 through 9 of the drawings, like numerals being used for like and corresponding parts of the various drawings.

Traditional electronic displays encode data as a two-dimensional (2D) matrix of pixels (x, y). This pixel data can be stored in various formats such as RGB, RGBA, BGR, and HSV. In contrast to the flat, 2D data representation of traditional electronic displays, light field displays provide a four-dimensional (4D) display of data. 4D light fields are generated using 4D plenoptic vectors that are composed of position (x, y) and angle (theta, phi), with a color value (e.g., RGB) for each permutation.

Traditional media content (e.g. images and video) typically does not contain the necessary angular information (theta, phi) for 4D light field displays. Computing the missing angular information is complex and computationally intensive. In practice, this means that 4D light field data must either be pre-rendered explicitly as 4D light field data (in a non-real-time fashion), or considerable GPU horsepower (e.g., arrays of high-end graphics cards) must be utilized to calculate the 4D data. 4D light field generation is so computationally expensive that it generally cannot be done in real-time without extremely powerful hardware (e.g., numerous GPUs running in parallel).

To address these and other difficulties and problems with providing 4D light fields, embodiment of the disclosure provide novel systems and methods for producing a light field from a depth map. In some embodiments, a system includes an electronic display, a computer processor, one or more memory units, and a module stored in the one or more memory units. The module is configured to access a source image stored in the one or more memory units and determine depth data for each pixel of a plurality of pixels of the source image. The module is further configured to map, using the plurality of pixels and the determined depth data for each of the plurality of pixels, the source image to a four-dimensional light field. The module is further configured to send instructions to the electronic display to display the mapped four-dimensional light field.

In general, embodiments disclosed herein provide systems and methods which render a 4D light field using 2D or 2.5D source image data. In typical systems, computing the 4D light field generally requires many render passes (i.e., one render pass for each plenoptic cell). This means, for example, a relatively low-spatial-resolution light field of ten plenoptic cells takes 10× more graphics processing power than the amount of processing power to render the same content on a traditional 2D screen. Most typical light field generation systems are predicated on brute-force computing the 4D plenoptic function (RGB for each x, y, theta, and phi). This is equivalent to rendering a scene from many different camera positions for each frame. This is computationally expensive and generally impractical (or impossible) for real-time content. Embodiments of the disclosure, however, circumvent the need for multiple render passes and instead programmatically compute the necessary data for a 4D light field from a single 2D or 2.5D source image. As will be appreciated, embodiments of the disclosure may provide a 10× to 100× decrease in the amount of time to produce a 4D light field over the approach of traditional systems.

For a near-eye light field system composed of plenoptic cells, each plenoptic cell's location represents a spatial position and each pixel location within that cell represents a ray direction. As such, embodiments of the disclosure transform data from a 2D or 2.5D source image into a 4D light field via one of two approaches. In a first approach, some embodiments perform simple replication of source imagery in an identical manner across each plenoptic cell. In these embodiments, 2D data is projected into infinity with no additional depth data. In a second approach, some embodiments utilize the depth buffer (intrinsically present for computer-generated 3D imagery) to programmatically compute ray direction (theta, phi) for each pixel in the 2D matrix. In essence, the second approach is identical to the first approach except each pixel within a plenoptic cell is shifted in x/y space as a function of its associated depth value.

The two approaches described above allow for rapid computation of the 4D light field data (x, y, theta, phi) from a 2D or 2.5D source image. Embodiments described herein allow for the generation of a 4D light field from a 2D or 2.5D source image in real time, even on low-end computing hardware (e.g., smartphone CPU/GPU). The embodiments described herein circumvent the need for multiple render passes, instead programmatically computing the necessary data from a single 2D or 2.5D source image. Thus, the disclosed embodiments are 10× to 100× faster than the traditional approach (depending on the spatial resolution of the target light field display). The disclosed embodiments may be a key enabler for extended reality (XR) visors, XR wall portals, XR construction helmets, XR pilot helmets, XR far eye displays, and the like. As used herein, XR includes Virtual Reality (VR), Augmented Reality (AR), Mixed Reality (MR), and any combination thereof.

FIG. 1 illustrates an example system 100 for producing a light field from a depth map. As seen in FIG. 1, system 100 includes a processor 110, memory 120, and an electronic display 130. One or more source images 150 and a depth map to light field module 140 may be stored in memory 120. Electronic display 130 includes multiple plenoptic cells 132 (e.g., 132A, 132B, etc.), and each plenoptic cell 132 includes multiple display pixels 134 (e.g., 134A-134P). For illustrative purposes only, electronic display 130 of FIG. 1 includes nine plenoptic cells 132, and each plenoptic cell 132 includes sixteen display pixels 134. This provides a 4D resultant light field that has a 4×4 angular resolution and a 3×3 spatial resolution. However, electronic display 130 may have any number of plenoptic cells 132 in any physical arrangement, and each plenoptic cell 132 may have any number of display pixels 134.

Processor 110 is any electronic circuitry, including, but not limited to microprocessors, application specific integrated circuits (ASIC), application specific instruction set processor (ASIP), and/or state machines, that communicatively couples to memory 120 and controls the operation of automatic alerting communications system 110. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of depth map to light field module 140. Processor 110 may be a programmable logic device, a microcontroller, a microprocessor, any suitable processing device, or any suitable combination of the preceding. Processor 110 is not limited to a single processing device and may encompass multiple processing devices.

Memory 120 may store, either permanently or temporarily, source images 150, operational software such as depth map to light field module 140, or other information for processor 110. Memory 120 may include any one or a combination of volatile or non-volatile local or remote devices suitable for storing information. For example, memory 120 may include random access memory (RAM), read only memory (ROM), magnetic storage devices, optical storage devices, or any other suitable information storage device or a combination of these devices. Depth map to light field module 140 represents any suitable set of instructions, logic, or code embodied in a computer-readable storage medium. For example, depth map to light field module 140 may be embodied in memory 120, a disk, a CD, or a flash drive. In particular embodiments, depth map to light field module 140 may include an application executable by processor 110 to perform one or more of the functions described herein.

Source image 150 is any image or electronic data file associated with an image. In some embodiments, source image 150 is captured by a camera. In some embodiments, source image 150 is a 2D image that contains color data but does not contain depth data. In some embodiments, source image 150 is a 2.5D image that contains color data plus depth data (e.g., RGB-D). In some embodiments, source image 150 is a stereographic image from a stereo pair. Source image 150 may contain any appropriate pixel data (e.g., RGB-D, RGBA, BGR, HSV, and the like).

Figure 2:
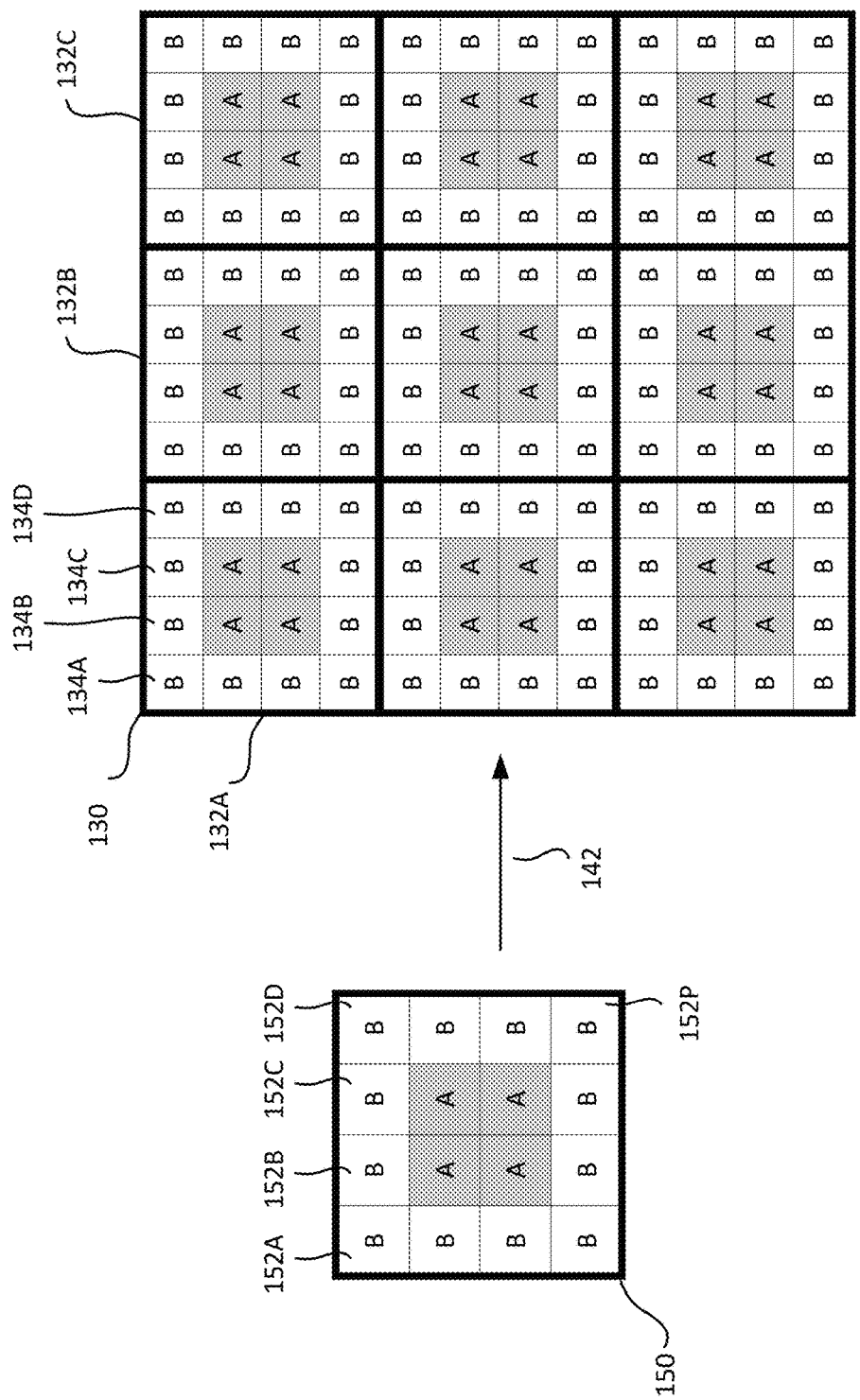
FIG. 2 is a diagrammatic view of a two-dimensional image to a four-dimensional light field mapping, according to certain embodiments.
Figure 3:
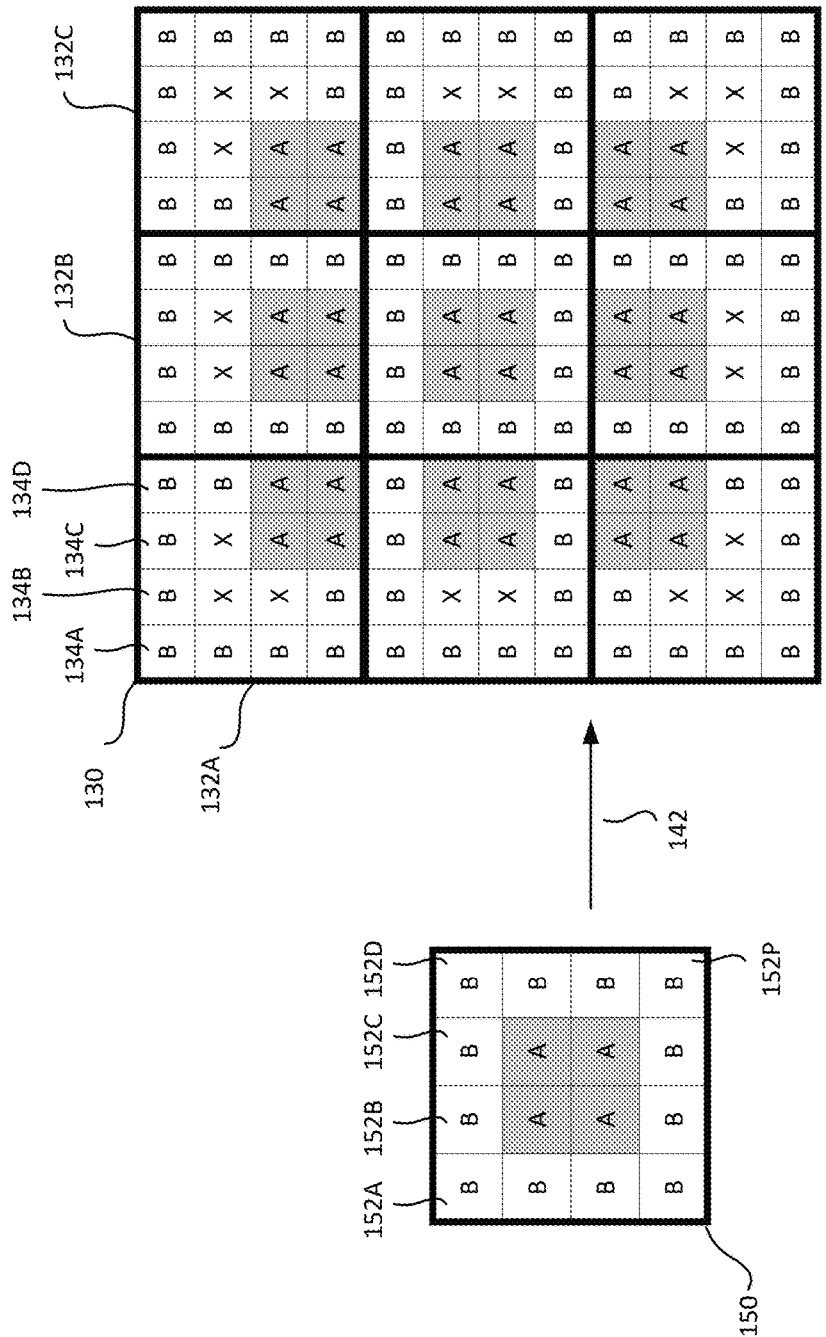
FIG. 3 is a diagrammatic view of a two and a half-dimensional image to a four-dimensional light field mapping, according to certain embodiments.

In operation, system 100 provides (via, e.g., depth map to light field module 140) a 4D light field for display on electronic display 130 from a 2D or 2.5D source image 150. To do so, depth map to light field module 140 accesses a source image 150 stored in memory 120 and determines depth data for each pixel 152 of a plurality of pixels 152 of the source image 150. If the source image 150 is a 2D image that does not contain depth data, depth map to light field module 140 may assume a constant depth for the image (e.g., infinity) and then map each pixel 152 of the source image 150 to a corresponding pixel 134 of each electronic display 130. For example, FIG. 2 is a diagrammatic view of a 2D source image 150 to a 4D light field mapping. As illustrated in FIG. 2, pixel 152A is mapped to display pixel 134A of each plenoptic cell 132 (i.e., all nine plenoptic cells 132), pixel 152B is mapped to display pixel 134B of each plenoptic cell 132, and so forth. The pixel data (i.e., color data plus constant depth) is sent from depth map to light field module 140 to electronic display 130 as light field pixel data 142 in order to produce the corresponding 4D light field. For example, as the pixel data (e.g., RGB+XYD) arrives at the parser, the RGB-D is copied to the corresponding (x,y) for each cell within the target buffer. On the other hand, if the source image 150 is a 2.5D image that does contain depth data, depth map to light field module 140 uses the depth data when mapping each pixel 152 of the source image 150 to a corresponding pixel 134 of each electronic display 130. For example, FIG. 3 is a diagrammatic view of a 2.5D source image 150 to a 4D light field mapping. As illustrated in FIG. 3, pixel 152A is mapped to display pixel 134A of each plenoptic cell 132 (i.e., all nine plenoptic cells 132), pixel 152B is mapped to display pixel 134B of each plenoptic cell 132, and so forth. The pixel data (e.g., RGB-D) is sent from depth map to light field module 140 to electronic display 130 as light field pixel data 142 in order to produce the corresponding 4D light field. For example, as the pixel data (e.g., RGB+XYD) arrives at the parser, the RGB-D is copied to the corresponding (x,y) for each cell within the target buffer, but is shifted as a function of the depth data. This is illustrated in FIG. 3 by the shifting of the 4 inner pixels of source image 150 (labeled "A" and shaded grey) in certain plenoptic cells 132.

Figure 4:
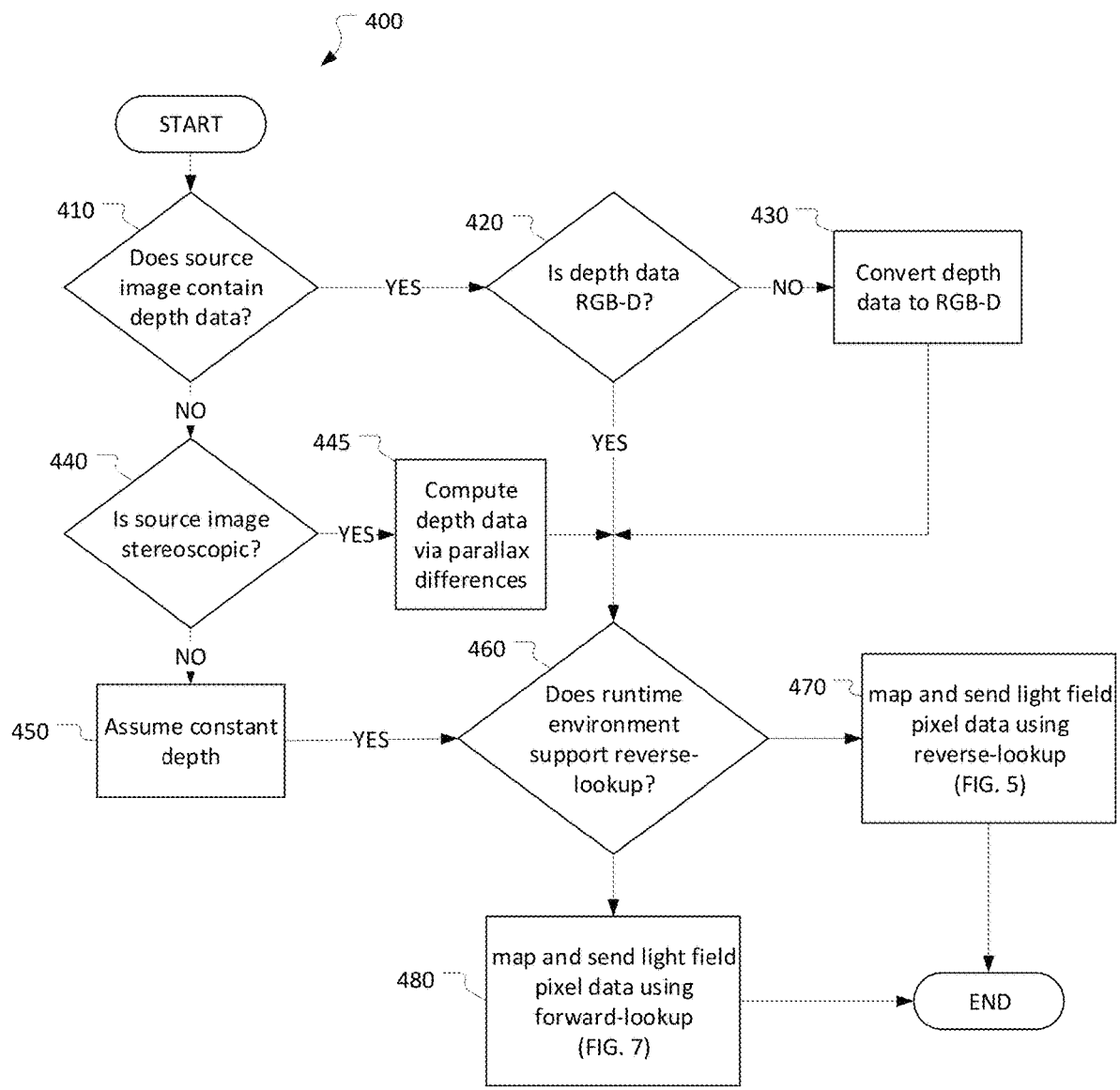
FIG. 4 is a flowchart of a method for producing a light field from a depth map, according to certain embodiments.

FIG. 4 illustrates a method 400 for producing a light field from a depth map. In general, method 400 may be utilized by depth map to light field module 140 to generate light field pixel data 142 from source image 150 and send light field pixel data 142 to electronic display 130 in order to display a 4D light field corresponding to the source image 150. To do so, method 400 may accesses a source image (e.g., source image 150) stored in one or more memory units (e.g., memory 120). Method 400 may then determine depth data for each pixel of a plurality of pixels of the source image (e.g., steps 410-450) and then map, using the plurality of pixels and the determined depth data for each of the plurality of pixels, the source image to a four-dimensional light field (e.g., steps 460-480). Each of these steps is described in more detail below.

At step 410, method 400 determines whether the source image contains depth data (e.g. from a render buffer). In some embodiments, the source image is source image 150. If the source image includes depth data, method 400 proceeds to step 420. If the source image does not include depth data, method 400 proceeds to step 440.

At step 420, method 400 determines if the depth data of the source image is RGB-D data. If the depth data of the source image is RGB-D data, method 400 proceeds to step 460. If the depth data of the source image is not RGB-D data, method 400 proceeds to step 430. At step 430, method 400 converts the depth data to RGB-D and then proceeds to step 460.

At step 440, method 400 determines if the source image is stereoscopic. If method 400 determines that the source image is stereoscopic, method 400 proceeds to step 445. If method 400 determines that the source image is not stereoscopic, method 400 proceeds to step 450.

At step 445, method 400 computes the depth data from the stereoscopic source image. In some embodiments, the depth data is computed via parallax differences. After step 445, method 400 proceeds to step 460.

At step 450, method 400 assigns a constant depth and a fixed location to the source image that is devoid of depth data. For example, method 400 may assign a constant depth of infinity After step 450, method 400 proceeds to step 460.

At step 460, method 400 determines if the runtime environment supports reverse-lookup (e.g., a hardware implementation for providing a light field). If method 400 determines that the runtime environment supports reverse-lookup in step 460, method 400 proceeds to step 470. If method 400 determines that the runtime environment does not support reverse-lookup in step 460, method 400 proceeds to step 480.

At step 470, method 400 maps and sends light field pixel data (e.g., light field pixel data 142) using reverse lookup (e.g., hardware implementation). In general, step 470 may include copying RGB+D to corresponding X & Y for each plenoptic cell within the target buffer as pixel data (RGB+XYD) arrives at the parser, shifting as a function of depth (D). In some embodiments, Ax*Ay total reads and Ax*Ay*Sx*Sy total writes may be performed. More details about certain embodiments of step 470 are described in more detail below with respect to FIG. 5. After step 470, method 400 may end.

At step 480, method 400 maps and sends light field pixel data (e.g., light field pixel data 142) using forward-lookup (e.g., software such as a graphics pipeline shader). In general, step 480 may include performing a ray-march for each pixel in output buffer along its corresponding theta/phi direction to determine target pixel data from the reference RGB-D map. In some embodiments, this may require Ax*Ay*Sx*Sy (parallelizable) ray-marches (where Ax & Ay are angular resolution width & height (e.g. pixels per cell) and Sx & Sy are spatial resolution width & height (e.g. cells per display). More details about certain embodiments of step 480 are described in more detail below with respect to FIG. 7. After step 480, method 400 may end.

Figure 5:
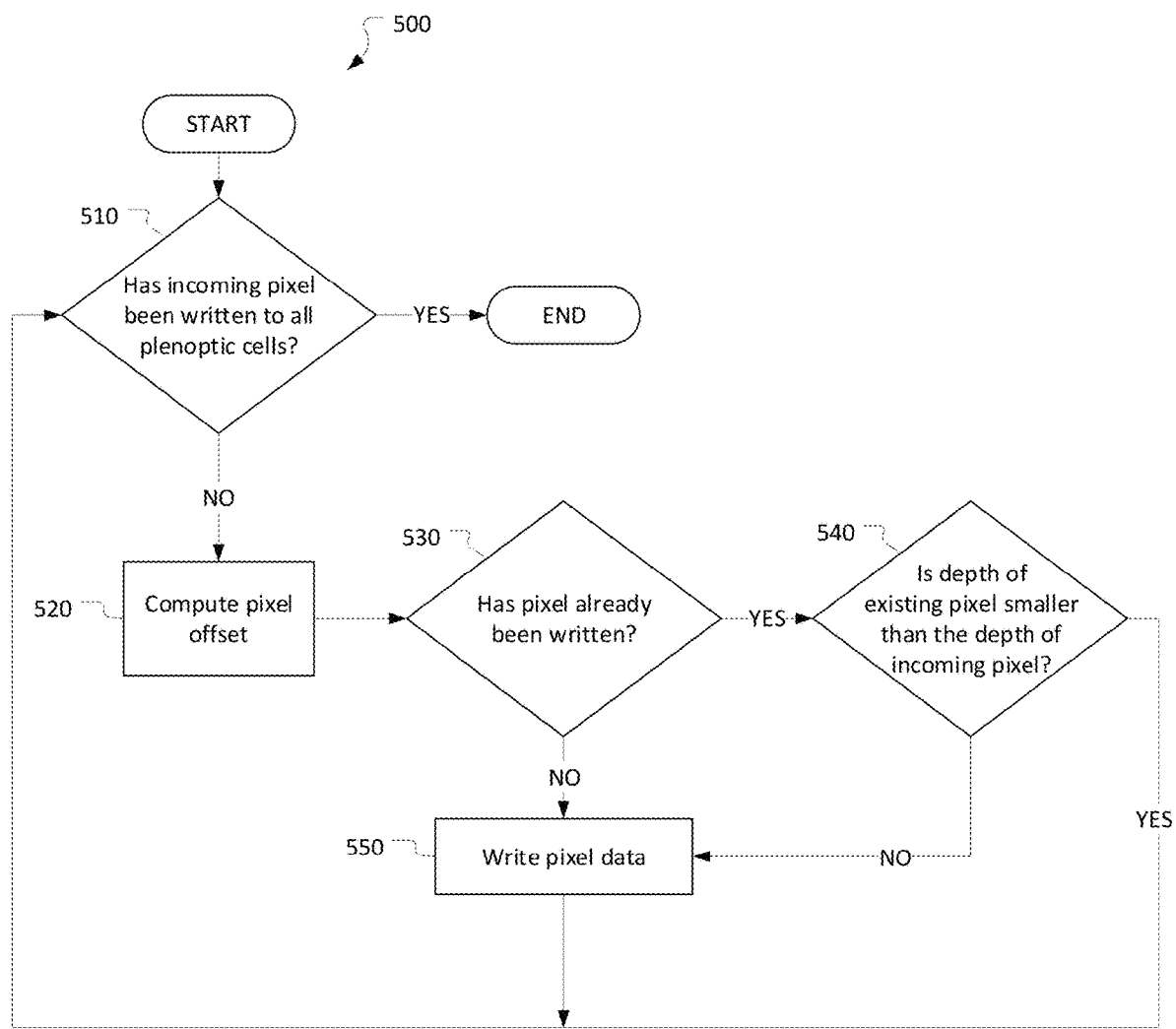
FIG. 5 is a flowchart of a method for producing a light field from a depth map using reverse-lookup, according to certain embodiments.
Figure 6:
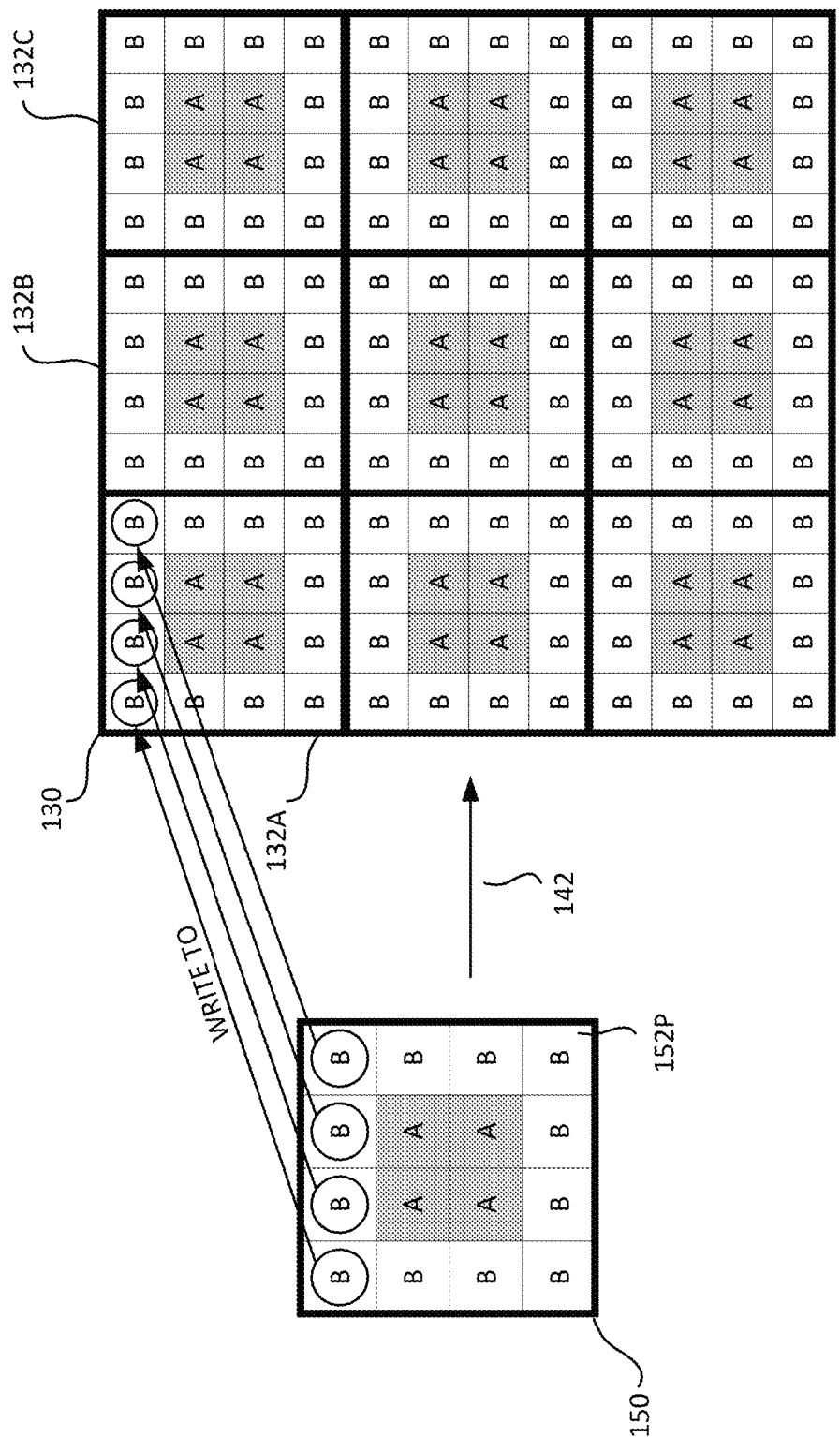
FIG. 6 is a diagrammatic view of a reverse lookup mapping for a hardware implementation, according to certain embodiments.

FIG. 5 is a flowchart of a method 500 for producing a light field from a depth map using reverse-lookup (e.g., hardware implementation), according to certain embodiments. FIG. 6 is a diagrammatic view of a reverse lookup-mapping for a hardware implementation such as method 500. In general, if parallelizable hardware is available, method 500 uses the color and depth (e.g., RGB-D) of the pixel in question to determine in which location in the output image to write that data. In step 510, method 500 determines if the incoming pixel 152 of source image 150 has been written to all plenoptic cells 132. If so, method 500 ends. Otherwise, method 500 proceeds to step 520. In step 520, method 500 uses the pixel's location in the display matrix (its cell) to determine the real world offset from the center of the light field display to its encompassing plenoptic cell's corners. In some embodiments, step 520 includes computing the pixel offset (dX/dY) as a ratio-of-slopes-function of the plenoptic cell position (cX/cY) and pixel depth (D). After step 520, method 500 proceeds to step 530.

In step 530, method 500 determines if the pixel has already been written at the location (X+dX, Y+dY) of this cell for this frame. If so, method 500 proceeds to step 540. If not, method 500 proceeds to step 550.

At step 540, method 500 determines if the depth of the already-written pixel is smaller (i.e., closer to the camera) than the depth of the not-yet-written pixel. If the depth of the already-written pixel is smaller than the depth of the not-yet-written pixel, method 500 does not write any pixel data for the incoming pixel and proceeds back to step 510. If the depth of the already-written pixel is not smaller than the depth of the not-yet-written pixel, method 500 proceeds to step 550.

In step 550, method 500 writes the pixel data (RGB+D) to location (X+dX, Y+dY) of the plenoptic cell. Because each pixel in a plenoptic cell represents a different ray direction (the angles theta and phi), method 500 may use the difference between the pixel's location and the plenoptic cells center, multiplied by the pitch of a cell, to calculate one side of a right triangle in step 550. Method 500 may use the given depth to calculate the other side of that same triangle. The ratio of those two sides generates an angle related to the pixel offset that should be applied when writing the output buffer data for the display. This relationship may be defined by taking that angle, converting it to degrees, multiplying by the pixels-per-degree of the display and the sign of the difference between the pixel's location and its cell center. This offset is then added to the original pixel x/y and its cell's center to create a new world position. The pixel's color value and depth are written to this position in the output buffer if it is closer than what was there before to create a part of the light field.

Method 500 may be implemented in low level code, firmware, or transistor-logic and run on hardware close to the light field display 130. In this application, identical synthetic content me be fed to each one and it may use its known position to calculate its portion of the light field.

Figure 7:
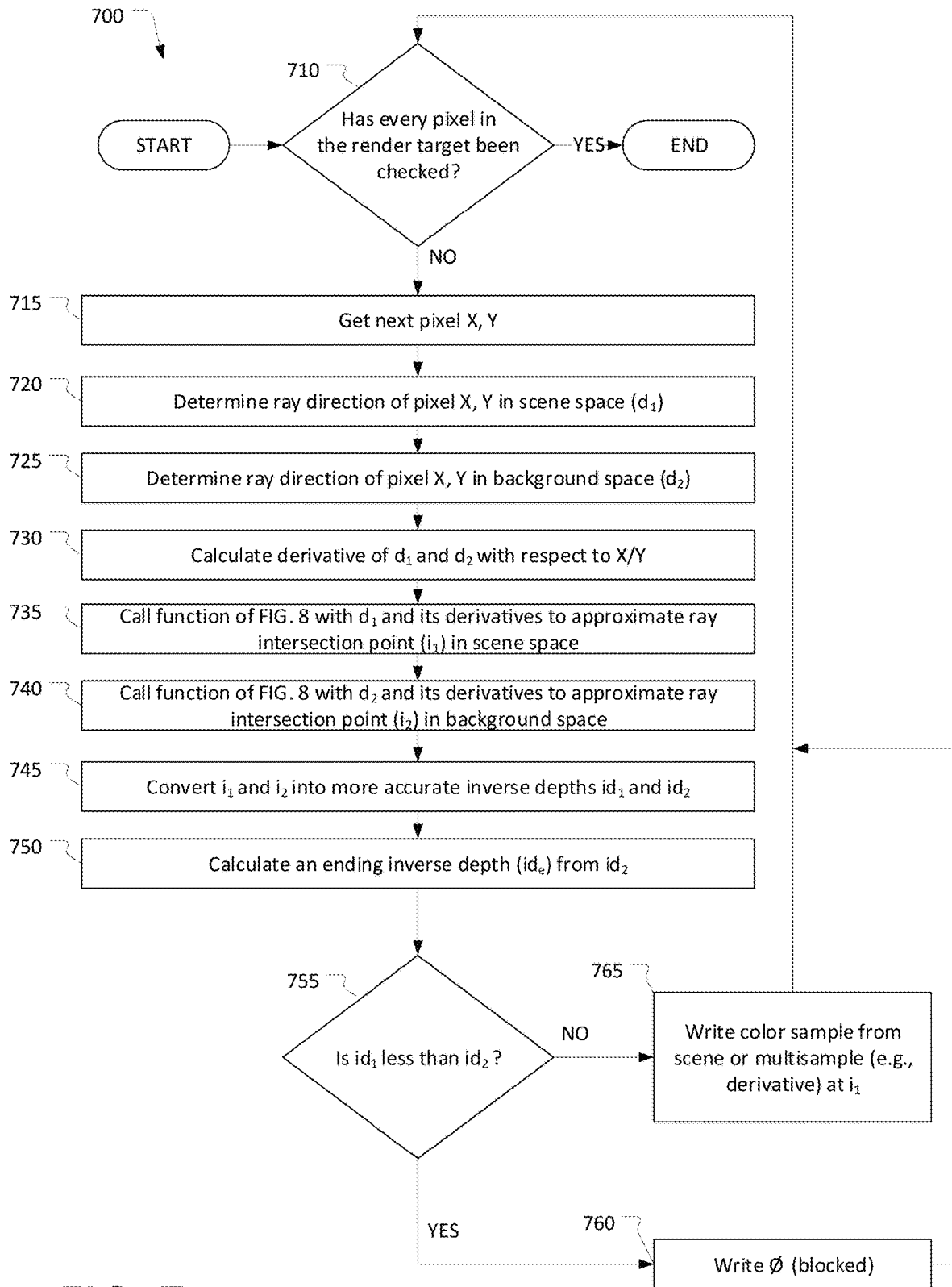
FIG. 7 is a flowchart of a method for producing a light field from a depth map using forward-lookup, according to certain embodiments.
Figure 9:
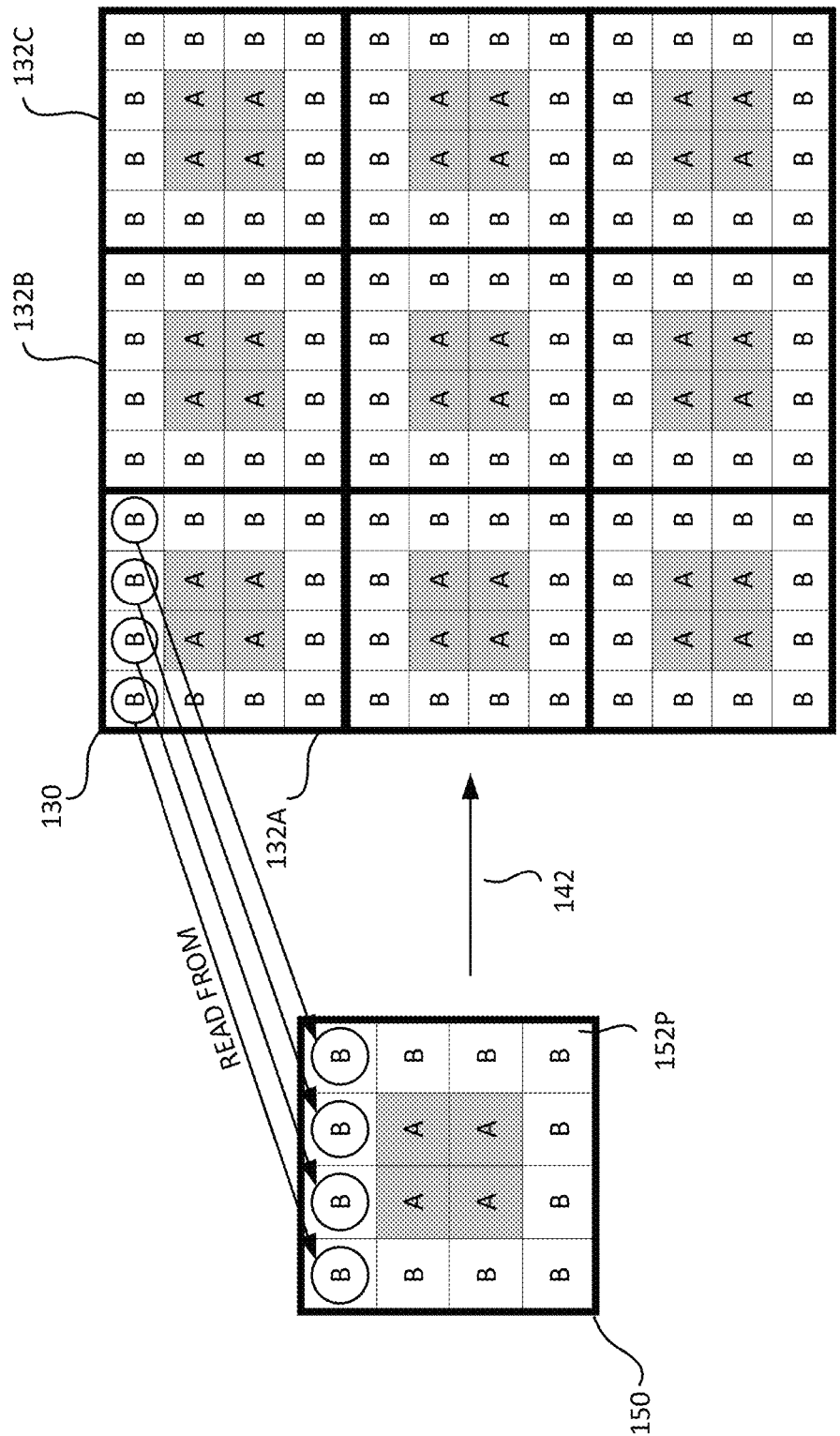
FIG. 9 is a diagrammatic view of a forward lookup mapping for a software implementation, according to certain embodiments.

FIG. 7 is a flowchart of a method 700 for producing a light field from a depth map using forward-lookup (e.g., software such as a graphics pipeline shader), according to certain embodiments. FIG. 9 is a diagrammatic view of a forward-lookup mapping for a software implementation such as method 700. In general, in the case where there is not a hardware implementation, it is possible to map the 4D light field from source image 150 using a loop. Method 700 uses the pixel in question's buffer location and the depth (if available) and cell location to determine which color should be placed in that same spot in the output buffer. At a high level, method 700 represents the location and direction in space of that cell within that particular pixel within the plenoptic cell into the virtual camera space so that the appropriate color to put in that cell can be looked up. As illustrated in FIG. 9, the operation of method 700 is opposite from that of method 500 (i.e., method 700 reads through the display pixels 134 of plenoptic cells 132 while method 500 reads through the source pixel data 152 of source image 150 as illustrated in FIG. 6). The first step of method 700 is to calculate the camera ray for the given pixel location. This is the ray direction that light is traveling along as it would intersect this pixel's cell location. This ray uses the world position of the pixel's cell as its origin and the angles theta and phi as its direction. These angles can be calculated from the pixel's offset from the center of its cell. The details of this calculation depend on if foveation or other mapping needs to take place and should not be assumed to be linear. The ray's origin is converted from pixel space to world space using known properties of the collection system such as near plane and field of view. Next, method 700 converts this ray into one in the depth (backspace). This transformation converts the 3D world space vector into a 2D depth space vector and uses inverse depth for comparisons. Next the derivatives for both the camera ray and the depth vector are calculated with respect to the spatial dimensions (x,y). These derivatives are then used in a loop to traverse through depth space to determine the closest object in the rendered buffer that the ray would hit. In the case of having a separate depth buffer, the depth space vector would also be traversed through its buffer. At the end, the closest object between the depth space and color space would determine the actual depth of the pixel's ray. In these steps it may be preferable to use the tangent of the inverse depth during the recursion for stability reasons. With the depth of the object that was hit, the origin of the ray and its direction, trigonometric relations (using known properties of the collector such as field of view) can be used to convert from world back to screen space to determine which source color image pixel's color data should be used for the output image at this pixel location. The specific steps of some embodiments of method 700 are described in more detail below.

Method 700 may begin in step 710 where method 700 determines if every pixel in the render target has been checked. If so, method 700 may end. Otherwise, method 700 proceeds to step 715.

At step 715, method 700 retrieves the next pixel X,Y in the render target. After step 715, method 700 proceeds to step 720 where method 700 determines the ray direction of pixel X,Y in the scene space ($d_1$). After step 715, method 700 proceeds to step 725 where method 700 determines the ray direction of pixel X,Y in the background space ($d_2$). After step 725, method 700 proceeds to step 730 where method 700 calculates the derivative of $d_1$ and $d_2$ with respect to X/Y. After step 730, method 700 proceeds to step 735 where method 700 calls the function of FIG. 8 using $d_1$ and its derivatives to approximate the ray intersection point $i_1$ in the scene space. After step 735, method 700 proceeds to step 740 where method 700 calls the function of FIG. 8 using $d_2$ and its derivatives to approximate the ray intersection point $i_2$ in the background space. After step 740, method 700 proceeds to step 745 where method 700 converts $i_1$ and $i_2$ into more accurate inverse depths $id_1$ and $id_2$. After step 745, method 700 proceeds to step 750 where method 700 calculates an ending inverse depth ($id_e$) from $id_2$. After step 750, method 700 proceeds to step 755.

At step 755, method 700 determines if $id_1$ is less than $id_2$. If $id_1$ is less than $id_2$, method 700 proceeds to step 760 where method 700 writes Ø (blocked) and then proceeds back to step 710. Otherwise, if $id_1$ is not less than $id_2$, method 700 proceeds to step 765 where method 700 writes the color sample form the scene or multisample (e.g., derivative) at $i_1$. After step 765, method 700 proceeds back to step 710.

In the forward-lookup application (i.e., FIG. 7), method 700 may be implemented as a post process shader in a game engine or render engine. This shader would take as input data from cameras placed in the synthetic scene and optionally depth buffers from those virtual cameras. Method 700 would then output a single image that contained the cells that make up the light field in an array of images.

Figure 8:
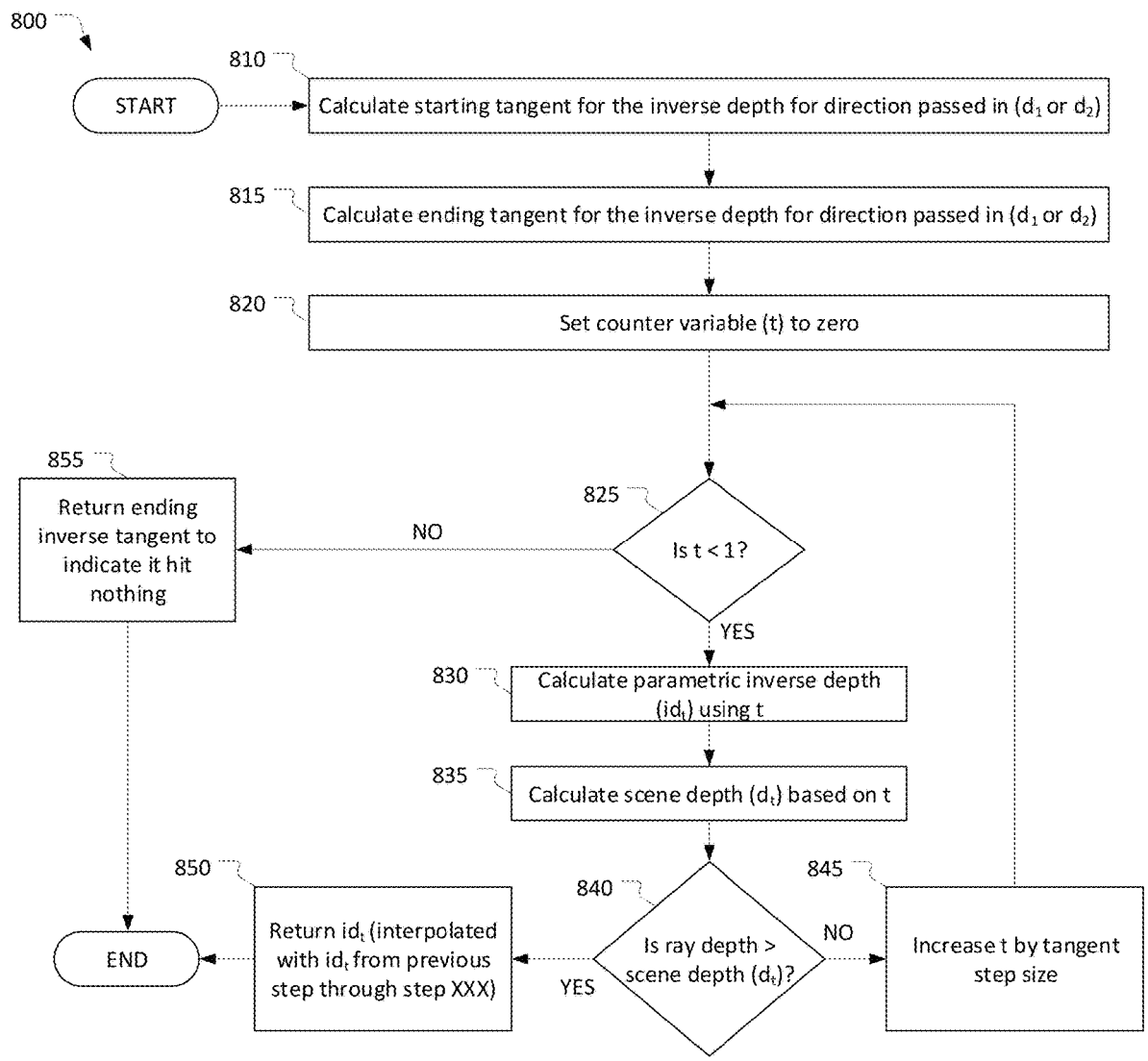
FIG. 8 is a flowchart of a sub-method of FIG. 7, according to certain embodiments.

FIG. 8 is a flowchart of a sub-method 800 of FIG. 7, according to certain embodiments. Method 800 is a parallax occlusion ray to inverse depth method that functions by raymarching with uniform steps in the pixel space. In general, method 800 first sets up a conversion between 3D space and the 2D space of the input render input. This allows method 800 to its iteration in a pixel-perfect manner while still doing the computation in 3D space. Not only does this provide better quality results, but it also provides drastic performance gains when the light field display is small with respect to the scene it is displaying.

Method 800 may begin in step 810 where method 800 calculates the starting tangent for the inverse depth for the direction passed in from method 700 ($d_1$ or $d_2$). After step 810, method 800 proceeds to step 820 where method 800 calculates the ending tangent for the inverse depth for the direction passed in from method 700 ($d_1$ or $d_2$). In general, in steps 810 and 820, method 800 obtains the tangents (original render space) corresponding to the start and end inverse depths along the input ray. Method 800 may in addition compute the constant step (corresponding to half of the diagonal length of one pixel) to be used in the raymarching.

In steps 820 and 825, method 800 begins a loop that takes a parameter 't' from 0 to 1. Method 800 considers t=0 to be the start of the input ray and t=1 to be the endpoint, and method 800 increments 't' by the previously described precomputed constant at each iteration of the loop (step 845). Because 't' is linearly related to the original render's pixel space, it has an inverse relation to depth of the input ray (i.e., t*depth is constant). Method 800 uses this fact to compute the depth of the input ray at each step in the raymarch (step 830 where method 800 calculates the parametric inverse depth $id_t$ using 't'), and method 800 uses the linear relation between t and the input pixel space to sample the input depth map, which is called the scene depth (step 835). On the first iteration in which the ray depth exceeds the scene depth (step 840), method 800 concludes that the ray has 'hit' something and takes an early exit to return an appropriately interpolated value (step 850). Otherwise, in the case that this never occurs before the end of the loop, method 800 returns an indication that we hit nothing (step 855). Method 800 thus is a parallax occlusion algorithm that results in an inverse depth, allowing it to return an intersection point (as an inverse depth along the ray) as well as returning a 'nothing hit' signal (as the input ending inverse depth).

The methods described herein mostly use tangent space as opposed to either pixel space or angle space, and mostly use inverse depth as opposed to depth. Both of these choices in space have both conceptual and computational advantages. For directions in 3D space and for locations on a 2D pinhole-style image, the space of choice is tangent space. This is defined with respect to the plane perpendicular to the view direction of the camera/light field so that for tangent coordinate {w_x, w_y}, the direction it points corresponds to the vector <x=w_x, y=w_y, z=1>. In plenoptic cellular light field contexts, tangent space may be the best choice because it is the most consistent, computationally cheapest option and is readily compatible with the other spaces (pixel space is tangent space with a scalar multiplier).

The use of inverse depth space offers many advantages. As noted above, in a standard camera projection, pixel position is inversely related to scene depth (coordinate parallel to the view direction, not distance to the camera) and therefore linearly related to inverse depth. This allows the disclosed embodiments to execute large sections of computation (such as pixel-perfect raymarching) without ever directly computing depth and without ever using a division. Another advantage of using inverse depth is a clean representation of infinity. An inverse depth of 0 may be used to refer to the 'back' of the scene as it is effectively a depth of infinity. This proves to be much more useful than the counterpart depth of zero that the inverse depth space renders unwieldy.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   an electronic display;
   a computer processor;
   one or more memory units; and
   a module stored in the one or more memory units, the module configured, when executed by the processor, to:
     access a source image stored in the one or more memory units, wherein the source image is a non-stereoscopic image that does not include depth data;
     determine depth data for each pixel of a plurality of pixels of the source image comprising assigning a constant depth value and a fixed location to the depth data;
     map, using the plurality of pixels and the determined depth data for each of the plurality of pixels, the source image to a four-dimensional light field; and
     send instructions to the electronic display to display the mapped four-dimensional light field.

2. The system of claim 1, wherein:
   the source image comprises the depth data; and
   determining the depth data for each pixel of the plurality of pixels of the source image comprises accessing the depth data of the source image from a render buffer.

3. The system of claim 1, wherein:
   the source image is a stereoscopic image that is devoid of the depth data; and
   determining the depth data for each pixel of the plurality of pixels of the source image comprises computing the depth data via parallax differences in the stereoscopic image.

4. The system of claim 1, wherein:
   the module is further configured, when executed by the processor, to determine whether a runtime environment for the system supports reverse-lookup;
   mapping, using the plurality of pixels and the determined depth data for each of the plurality of pixels, the source image to the four-dimensional light field comprises using reverse-lookup when it is determined that the runtime environment for the system supports reverse-lookup; and
   mapping, using the plurality of pixels and the determined depth data for each of the plurality of pixels, the source image to the four-dimensional light field comprises using forward-lookup when it is determined that the runtime environment for the system does not support reverse-lookup.

5. The system of claim 1, wherein:
   the electronic display comprises a plurality of plenoptic cells, each plenoptic cell comprising a plurality of display pixels; and
   mapping, using the plurality of pixels and the determined depth data for each of the plurality of pixels, the source image to the four-dimensional light field comprises copying pixel data for each of the plurality of pixels of the source image to a corresponding display pixel of each of the plenoptic cells.

6. The system of claim 5, wherein the corresponding display pixel is determined as a function of the depth data of the corresponding pixel of the source image.

7. The system of claim 1, wherein:
   mapping, using the plurality of pixels and the determined depth data for each of the plurality of pixels, the source image to the four-dimensional light field comprises using reverse-lookup.

8. The system of claim 1, wherein:
   mapping, using the plurality of pixels and the determined depth data for each of the plurality of pixels, the source image to the four-dimensional light field comprises using forward-lookup.

9. A method by a computing device, the method comprising:
   accessing a source image stored in one or more memory units, wherein the source image is a non-stereoscopic image that does not include depth data;
   determining depth data for each pixel of a plurality of pixels of the source image comprises assigning a constant depth value and a fixed location to the depth data;
   mapping, using the plurality of pixels and the determined depth data for each of the plurality of pixels, the source image to a four-dimensional light field; and
   sending instructions to an electronic display to display the mapped four-dimensional light field.

10. The method of claim 9, wherein:
    the source image comprises the depth data; and
    determining the depth data for each pixel of the plurality of pixels of the source image comprises accessing the depth data of the source image from a render buffer.

11. The method of claim 9, wherein:
    the source image is a stereoscopic image that is devoid of the depth data; and
    determining the depth data for each pixel of the plurality of pixels of the source image comprises computing the depth data via parallax differences in the stereoscopic image.

12. The method of claim 9, further comprising determining whether a runtime environment for the computing device supports reverse-lookup, wherein:
    mapping, using the plurality of pixels and the determined depth data for each of the plurality of pixels, the source image to the four-dimensional light field comprises using reverse-lookup when it is determined that the runtime environment for the system supports reverse-lookup; and
    mapping, using the plurality of pixels and the determined depth data for each of the plurality of pixels, the source image to the four-dimensional light field comprises using forward-lookup when it is determined that the runtime environment for the system does not support reverse-lookup.

13. The method of claim 9, wherein:
    the electronic display comprises a plurality of plenoptic cells, each plenoptic cell comprising a plurality of display pixels; and
    mapping, using the plurality of pixels and the determined depth data for each of the plurality of pixels, the source image to the four-dimensional light field comprises copying pixel data for each of the plurality of pixels of the source image to a corresponding display pixel of each of the plenoptic cells.

14. One or more computer-readable non-transitory storage media embodying software that is operable when executed to:
- access a source image stored in the one or more computer-readable non-transitory storage media, wherein the source image is a non-stereoscopic image that does not include depth data;
- determine depth data for each pixel of a plurality of pixels of the source image comprising assigning a constant depth value and a fixed location to the depth data;
- map, using the plurality of pixels and the determined depth data for each of the plurality of pixels, the source image to a four-dimensional light field; and
- send instructions to an electronic display to display the mapped four-dimensional light field.

15. The media of claim 14, wherein:
the source image comprises the depth data; and
determining the depth data for each pixel of the plurality of pixels of the source image comprises accessing the depth data of the source image from a render buffer.

16. The media of claim 14, wherein:
the source image is a stereoscopic image that is devoid of the depth data; and
determining the depth data for each pixel of the plurality of pixels of the source image comprises computing the depth data via parallax differences in the stereoscopic image.

17. The media of claim 14, wherein:
the software is further operable when executed to determine whether a runtime environment supports reverse-lookup;
mapping, using the plurality of pixels and the determined depth data for each of the plurality of pixels, the source image to the four-dimensional light field comprises using reverse-lookup when it is determined that the runtime environment for the system supports reverse-lookup; and
mapping, using the plurality of pixels and the determined depth data for each of the plurality of pixels, the source image to the four-dimensional light field comprises using forward-lookup when it is determined that the runtime environment for the system does not support reverse-lookup.

* * * * *